United States Patent [19]

Soo

[11] Patent Number: 5,780,747

[45] Date of Patent: Jul. 14, 1998

[54] OPEN CHANNEL MULTICHANNEL ULTRASONIC FLOWRATE MEASUREMENT APPARATUS AND METHOD

[75] Inventor: Chang Hak Soo, Seoul, Rep. of Korea

[73] Assignee: Changmin Co., Ltd., Seoul, Rep. of Korea

[21] Appl. No.: 573,637

[22] Filed: Dec. 18, 1995

[51] Int. Cl.$^6$ ............................................. G01F 1/00
[52] U.S. Cl. ............................................. 73/861.29
[58] Field of Search ................ 73/861.18, 861.27, 73/861.28, 861.29, 861.31

[56] References Cited

U.S. PATENT DOCUMENTS

| | | | |
|---|---|---|---|
| 5,515,721 | 5/1996 | Kim et al. | 73/861.27 |
| 5,531,124 | 7/1996 | Kim et al. | 73/861.27 |
| 5,531,125 | 7/1996 | Ahn et al. | 73/861.27 |

*Primary Examiner*—Ronald L. Biegel
*Attorney, Agent, or Firm*—Laurence R. Brown

[57] ABSTRACT

A measurement method for distances between ultrasonic transducers installed on opposite banks of a river or open water channel is provided. Ultrasonic transducer clusters having two transducers spaced by a known distance are used for multichannel ultrasonic flowrate measurement. The distance between ultrasonic transducers installed in the water on both sides of the river is determined by the measurement of the horizontal average flow velocity directly by ultrasonic waves. A calibration and testing method is provided for the distance between two ultrasonic transducers included in the clustered ultrasonic transducer for the calibration and testing method of the flowrate measurement error for a multichannel ultrasonic flowrate measurement system, and for the clustered ultrasonic transducer apparatus.

7 Claims, 4 Drawing Sheets

OPEN CHANNEL MULTICHANNEL ULTRASONIC FLOWRATE MEASUREMENT APPARATUS AND METHOD

BACKGROUND OF THE INVENTION

This invention is concerned with a technology to measure open channel flow velocity and the flowrate using ultrasonic waves. In particular, a measurement system for the flowrate uses ultrasonic waves for open channels mainly large rivers and large artificial open channels.

PRIOR ART

A method to calculate the flowrate by measuring the horizontal average flow velocity by ultrasonic waves is widely known. Among the ultrasonic flow meters, there are two kinds classified by the measurement channels; one is equipped with a single-channel system for the measurement of horizontal average flow velocity, and another one is equipped with a multi-channel system. For example, the Ultraflux Company has developed and sells multi-channel ultrasonic flow meters, UF-2100.

FIGS. 1 and 2 show the basic principle of above mentioned open channel flowrate measurement methods by ultrasonic waves.

As shown in FIG. 1, the ultrasonic transmitters and receivers (called transducer(s) below), $(1_A, 1_B), (2_A, 2_B), (3_A, 3_B), \ldots$, are installed along the skirt (or bank) of the river at a constant distance, h, and at a constant angle, $(\phi_i)$ with respect to the flow direction.

The measurement method for the average flow velocity along the horizontal line as shown in FIG. 2 is explained below.

The time interval, $t_{AB}$, from the moment that the ultrasonic pulse is transmitted from the transducer, $(1_A)$, to the transducer, $(1_B)$, to the moment that the ultrasonic pulse is received by the transducer, $(1_B)$, is measured. The time interval, $t_{BA}$, from the moment that the ultrasonic pulse is transmitted from the transducer, $(1_B)$, to the moment that the ultrasonic pulse is received by the transducer, $(1_A)$, is also measured. It is assumed that for the time intervals, $t_{AB}$ and $t_{BA}$, that the ultrasonic pulse is propagated from $(1_A)$ to $(1_B)$ and vice versa are given as follows;

$$t_{AB} = \frac{L}{C+v} \; ; \; t_{BA} = \frac{L}{C-v} \tag{1}$$

where L is the distance between transducers, $(1_A)$ and $(1_B)$, C is the ultrasonic velocity in the river water, and $v=\overline{V}\cos\phi$ where V is the average flow velocity along the horizontal line, and v is a velocity component along the path of ultrasonic pulse.

The average flow velocity, $\overline{V}$, is calculated by the following equation (UF-2100 flow meter of Ultraflux Company);

$$\overline{V} = \frac{L^2}{2d}\left(\frac{1}{t_{AB}} - \frac{1}{t_{BA}}\right) = \frac{L^2}{2d}\Delta f \tag{2}$$

The measurement method of flow velocity using eq. (2) is called a frequency difference method. d/L is $\cos\phi$ in eq. (2).

The horizontal average flow velocities at various depths are measured using above equation, and the flowrate of river is calculated using the following equation;

$$Q = \sum_{i=1}^{n}(\overline{V}_i \cdot S_i) = \sum_{i=1}^{n}|\overline{V}_i \cdot (h \cdot B)_i| \tag{3}$$

where B is width of river at which the measurement is made. It is supposed that the measurement of the flowrate of river is accurate enough when n=10. There are various equations for the calculation of the flowrate, Q, and more accurate equations than eq. (3) are also available. Fundamental measurement is the measurement of horizontal average flow velocity at various depths when any equations are used for the calculation of flowrate, and the measurement error of the flowrate is dependent on the measurement error of the flow velocity.

Besides the above mentioned flowrate calculation equation (2) using the frequency difference method, a flowrate calculation equation using the time difference method is also widely used. The equations using the time difference method are given as follows;

$$\Delta t = t_{BA} - t_{AB} = \frac{2vL}{C^2} = \frac{2\overline{V}\cos\phi \cdot L}{C^2}; \tag{4}$$

$$\overline{V} = \frac{\Delta t C^2}{2L\cos\phi}$$

The eq. (4) becomes as follows when using $t_{AB} \cdot t_{BA} = L^2/C^2$ instead of C, and $\cos\phi = d/L$ $$\overline{V} = \frac{L \cdot \Delta t}{2t_{AB} \cdot t_{BA}\cos\phi} = \frac{L^2}{2d}\frac{\Delta t}{t_{AB} \cdot t_{BA}} \tag{5}$$

Eq. (2) and eq. (5) are exactly the same.

As shown in eq. (5), item $L^2$ is used and since there is a measurement error of distance, $\delta_L$, $2\delta_L$ is added to the measurement error of flow velocity. Therefore, it is required to measure the distance, L, precisely. However, it is impossible to measure the distance, L, directly using a length measurement apparatus since transducers are submerged in the water. It is common that the measurement error of horizontal average flow velocity is increased due to the measurement error of distance, $\delta_L$.

This invention is to provide the multi-channel ultrasonic flow measurement method and apparatus for which the distance between transducers in the water, L, is measured by the flow meter itself using ultrasonic waves, and the calibration and testing method for the flow meter.

Before detailed explanation of this invention, the propagation path of ultrasonic wave is explained first.

FIG. 3 shows the propagation path of ultrasonic pulse which propagates from transducer $(1_A)$ (or $(1_B)$) to transducer $(1_B)$ (or $(1_A)$). As shown by the dotted lines in FIG. 3, an ultrasonic beam transmitted towards L direction arrives at a point, a or b, not at the point, $1_A$ or $1_B$. On the other hand, the ultrasonic pulse transmitted from the transducer, $(1_A)$, arrives at the transducer, $(1_B)$, along the path $L_1$, and the ultrasonic pulse transmitted from the transducer, $(1_B)$, arrives at the transducer, $(1_A)$, along the path $L_2$. The paths $L_1$ and $L_2$ are not the same, that is, $L_2 > L_1$.

If the directional pattern angle of the transducer is narrow when installing the ultrasonic flow meter for river, it is known that the received signal is weak when the transducers are installed along the line L, that is, at an angle of $\phi$ as shown in FIG. 2, and the received signal is strong when the transducers are installed at an angle larger than $\phi$ as shown in FIG. 4. It can be proved that the propagation path of ultrasonic pulse looks like FIG. 3 using this phenomenon.

The propagation time of ultrasonic wave is given as follows;

$$t_{AB} = \frac{L_1}{C} \; ; \; t_{BA} = \frac{L_2}{C}$$

And since $L_2$ is larger than $L_1$, $t_{BA}$ is longer than $t_{AB}$. Furthermore, $L_1$ and $L_2$ become as follows;

$$L_1 = \frac{B}{\sin\theta_1} \; ; L_2 = \frac{B}{\sin\theta_2}$$

where B is the width of the open channel, $\theta_1$ and $\theta_2$ are the transmitting angles of ultrasonic beam which arrives first, and $\theta_1 \neq \theta_2 \neq \phi$. This is the path of the ultrasonic beam in the liquid. However, it is proved that the following relationships are realized.

$$t_1 = \frac{L}{C+v} \quad (6)$$

$$t_2 = \frac{L}{C-v}$$

where L is the distance between transducers, (A) and (B), and v is $\overline{V}\cos\phi$, velocity component on the line L. The measurement equation for flow velocity (5) is derived using eq. (6). The relationships between L, $L_1$ and $L_2$ are given as follows;

$$L = L_1\left(1 + \frac{v}{C}\right) \quad (7)$$

$$L = L_2\left(1 - \frac{v}{C}\right)$$

What is directly measured is not the geometrical distance L, but the distances of the propagation path of ultrasonic wave, $L_1$ or $L_2$, which will be substituted into eq. (5) according to this invention.

If it is assumed that $L_1$ and $L_2$ are the same as L, the supplemental measurement error of the flow velocity might occur when the component of flow velocity, v, is large. For example, when it is compared between v=1 m/s and v=6 m/s (flow velocity is very high). The ratio of v to C is given as follows (when C=1425 m/s);

$$\frac{v}{C} = \frac{1.0}{1425} \approx 0.0007 ; \frac{v}{C} = \frac{6.0}{1425} \approx 0.0042$$

Therefore, the measurement errors of distance, L, become 0.07% and 0.42% when v=1 m/s and v=6 m/s, respectively. Eventually the supplemental errors according to the measurement error of L which measures the flow velocity using eq. (5) are 0.14% and 0.84%, respectively. Therefore, the method to consider v/C is provided when the flow velocity is large according to this invention.

Therefore, the main objective of this invention by measuring the distance between transducers installed in the water is to provide ultrasonic flowrate measurement apparatus and method for open channels and rivers which have significantly reduced measurement error of the flow velocity.

Another objective of this invention is to provide the calibration and testing method of flowrate measurement apparatus using horizontal flow velocity measured at various depths and horizontal flow velocity measurement apparatus measuring flow velocity by direct measurement of distance between transducers.

The multi-channel ultrasonic flowrate measurement apparatus is composed of the following components according to this invention.

A primary clustered transducer set with two paired and spaced ultrasonic transducers installed at a constant distance, the multi-channel apparatus with the secondary transducer placed apart by distance apart, L, from a third primary clustered transducer for horizontal average flow velocity measurement, a mounting bracket to install the above mentioned clustered transducers along the water depth at a constant distance apart, and an ultrasonic pulse oscillator to vibrate the above mentioned transducers. A switch commutator with a switching function to give outputs in turn by sending ultrasonic pulses to the transducers and receiving corresponding ultrasonic pulses; a wave forming apparatus for processing the received signals from the switch commutator; a time interval measurement apparatus to measure the propagation time between the primary and the secondary transducers; a synchronized signal generator to generate a clock signal with a certain period; and calculation and control apparatus to measure the flowrate and flow velocity by processing the signal from the above mentioned time interval measurement apparatus.

The primary clustered transducer has a first transducer of annular ring shape connected to an exterior oscillator, a first housing with a central part defining a cavity, a pipe of a constant length fixed to the central part of the first case, and another ultrasonic transducer is fixed to a second housing, producing the guaranteed constant distance, $\lambda$, between the first transducer and the second transducer of the primary clustered transducer.

Furthermore, the multi-channel ultrasonic flowrate measurement apparatus of this invention operates with the following steps; a step comprising the multi-channel ultrasonic flow velocity measurement channel such that a clustered transducer set containing the primary transducer, ($1_{A1}$), and a secondary transducer, ($1_{C1}$) separated at a constant distance, $\lambda$, is installed along the skirt of one side of the open channel, and another clustered transducer set is installed along the skirt of the opposite side of the open channel; a step adjusting the location of the ultrasonic transducers such that ultrasonic waves transmitted by ultrasonic transducers, ($1_{A1}$), ($1_{B1}$) and ($1_{C1}$) so that their signals become the maximum level when receiving; a step measuring the average flow velocities along distance $L_i$ as a horizontal line such that the propagation times, $t_{AiBi}$ and $t_{CiBi}$, as ultrasonic pulses are transmitted from the preliminary transducers, ($1_{A1}$), and the secondary transducers ($1_{C1}$), to other transducers, ($1_{B1}$), are measured, and the propagation times, $t_{BiAi}$ and $t_{BiCi}$, that the ultrasonic pulses are transmitted from transducers, ($1_{B1}$), to the previous and the secondary transducers, ($1_{A1}$) and ($1_{C1}$); and a step calculating the flowrate by calculating the average flow velocity on the cross sectional area of water flow.

According to this invention, the calibration and testing of the flow velocity measurement apparatus is available, and this calibration method comprises of the following steps; a step measuring the propagation time of ultrasonic pulse, $t_{AB}$ and $t_{CB}$, from the first and the second transducers to a third transducer, during which the first and the second transducers, (A) and (B), are located by a constant distance, $\lambda$, and the third transducer is located at a point, B, in a water tank; a step calibrating the distance, $\lambda$, and testing the measurement error of the time interval measurement apparatus, for which the third transducer at B is moved to another point B' and propagation times of ultrasonic pulses, $t_{AB'}$ and $t_{CB'}$, from the first and the second transducers to another transducer are measured.

Therefore, the flow rate measurement of error of the ultrasonic flow meter can be decreased by significantly decreasing the measurement error of average flow velocity at several cross sections of a river or large closed conduit according to this invention.

Especially, it is convenient that it is not required to measure the distances between transducers located on both sides of the river or a closed conduit with a length measurement apparatus, but these distances can be measured by the flow meter itself. Therefore, this invention can be applied to any ultrasonic instruments that are required to measure the distance of the propagated path of ultrasonic pulse.

BRIEF DESCRIPTION OF THE DRAWINGS

This invention will now be described in detail with reference to the attached drawings, in which.

DETAILED DESCRIPTION OF THIS INVENTION

The detailed explanation according to the attached drawings is given as follows.

Figure 1:
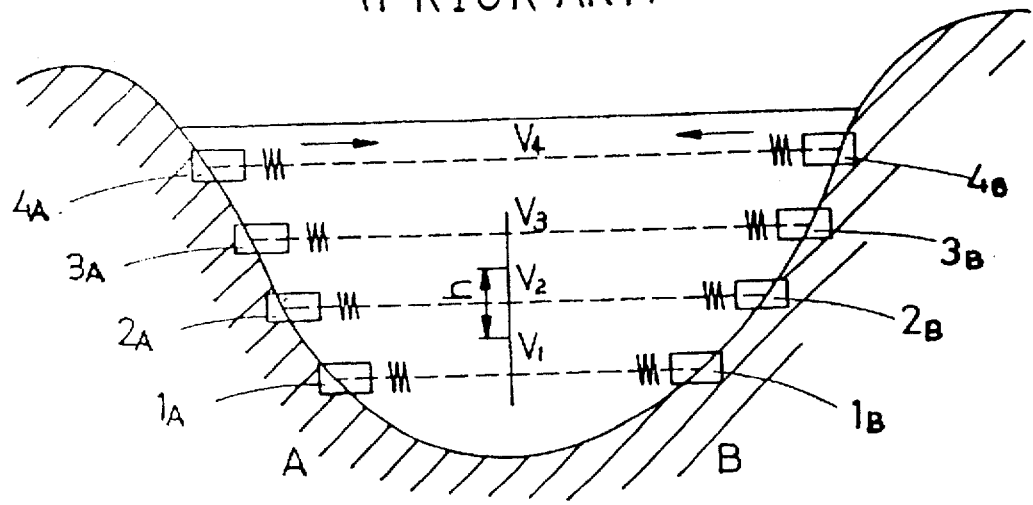
FIG. 1 is a view explaining the measurement principle of multichannel ultrasonic flowrate for a river.
Figure 2:
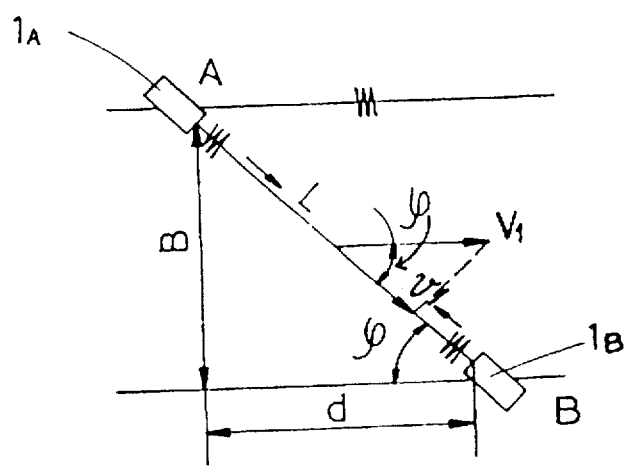
FIG. 2 is a view explaining the measurement principle of the conventional horizontal average flow velocity.
Figure 3:
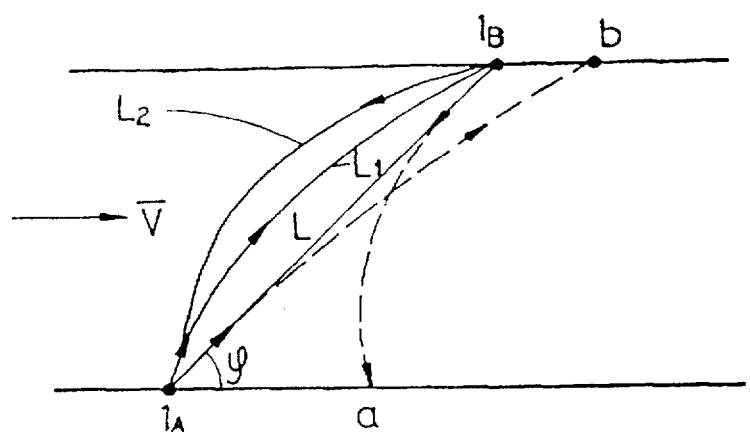
FIG. 3 is a view showing the propagation path of ultrasonic waves.
Figure 4:
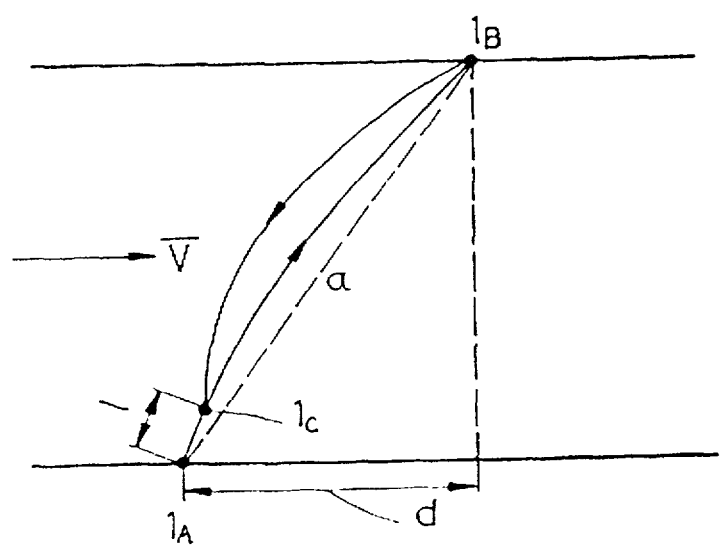
FIG. 4 is a view explaining the measurement method of horizontal average flow velocity according to this invention.

As shown in FIG. 4, the transducers, ($1_A$) and ($1_B$), are installed on the both sides of the open channel at constant depths, and another transducer, ($1_C$), is installed at a distance, $\lambda$, along the direction which the ultrasonic pulse is transmitted. (The transducers, ($1_A$) and ($1_C$), are clustered transducers.) The propagation times of ultrasonic pulses, $t_{AB}$, from the transducer ($1_A$) to the transducer, ($1_B$), along the flow direction $\overline{V}$, $t_{CB}$, from the transducer, ($1_C$), to the transducer, ($1_B$), $t_{BC}$ and $t_{BA}$, from the transducer, ($1_B$), to the transducers, ($1_C$) and ($1_A$) are measured. The, above mentioned propagation times are given as follows;

$$t_{AB} = \frac{L_1}{C}$$

$$t_{BA} = \frac{L_2}{C}$$

$$t_{CB} = \frac{L_1 - l}{C}$$

$$t_{BC} = \frac{L_2 - l}{C}$$

The ratio, $t_{CB}/t_{AB}$, is given as follows from eq. (8);

$$\frac{t_{CB}}{t_{AB}} = 1 - \frac{l}{L_1}$$

Therefore, $L_1$ becomes as follows;

$$L_1 = \frac{l}{1 - \frac{t_{CB}}{t_{AB}}} = \frac{t_{AB}}{t_{AB} - t_{CB}} \cdot l = L \quad (9)$$

Same as above, $L_2$ can be found from $t_{BC}/t_{BA}$;

$$L_2 = \frac{t_{BA}}{t_{BA} - t_{BC}} \cdot l = L \quad (10)$$

It does not matter to use the average value of $L_1$ and $L_2$;

$$\overline{L} = \frac{L_1 + L_2}{2}$$

The error of L measured by eq. (9) or (10) is sometimes not negligible when the flow velocity is large. For this case, L is measured precisely as follows.

The component of flow velocity, v', is measured by eq. (5) with $\cos\phi=1$ and $L_1$ from eq. (9). There is some difference between v' and v. The distance between transducers, L, is calculated using eq. (6) and v';

$$L = L_1 \left( 1 + \frac{v'}{C} \right) \quad (11)$$

where the ultrasonic velocity, C, is given as $$C = \frac{L_1}{(t_{AB} \cdot t_{BA})^{1/2}} .$$

If the error of L is 1% when not considering the v/C, even though v'/C has 5% difference compared with v/C, the error of L found from v'/C of 5% error is very precise (0.05%). The flow velocity can be found using eq. (5) by storing the distance between transducers, $L_i$, into the calculating apparatus for the flow velocity and the flowrate or by substituting the measured $L_i$.

Figure 5:
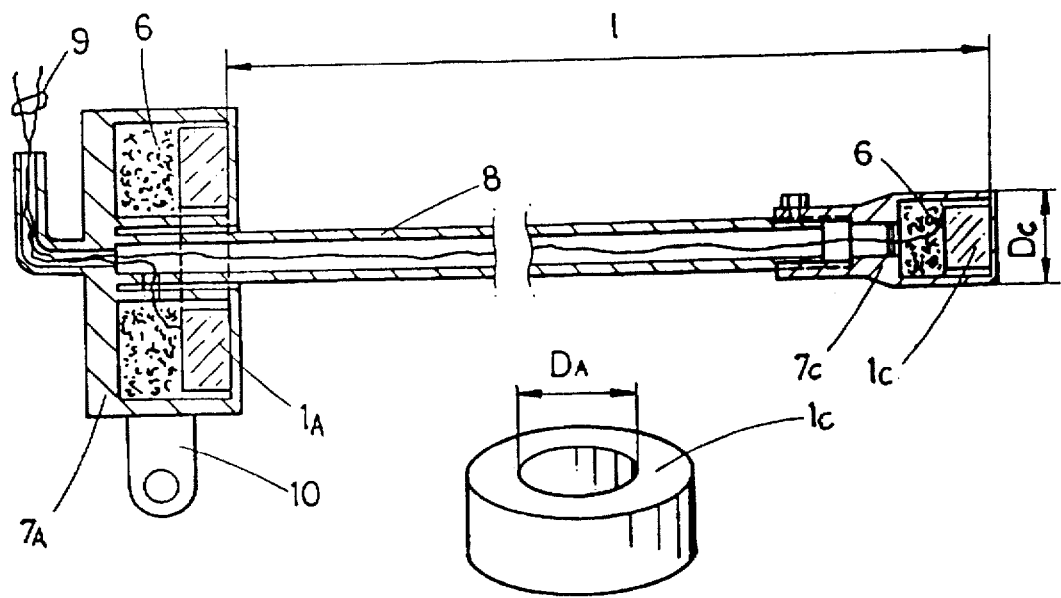
FIG. 5 is a view showing the cross section of the clustered ultrasonic transducer assembly for the measurement of horizontal average flow velocity according to this invention.

The structure of the clustered transducer realizing the measurement method of the flow velocity is shown in FIG. 5. As shown in FIG. 5, the transducer, ($1_A$), of annular ring shape for the measurement of flow velocity is made of piezoelectric ceramics, and the transducer, ($1_C$), made of conic piezoelectric ceramics for the measurement of propagation path of ultrasonic wave is installed at the end of pipe, (8), by the distance, $\lambda$, from the transducer, ($1_A$).

The pipe, (8), is connected to the case, ($7_C$), of transducer, ($1_C$), via the case, ($7_A$), of the transducer, ($1_A$). The distance, $\lambda$, can be adjusted since the case, ($7_C$), of the transducer can be moved along the pipe, (8).

The rear parts of the transducers, ($1_A$) and ($1_C$), are filled with damping material, (6), to enhance the efficiency of ultrasonic wave transmittance. For example, oxidized tungsten powder can be used as the damping material.

In FIGS. (5), (9) is a cable wire to connect transducers, ($1_A$) and ($1_C$), and (10) is a mounting link connected to the mounting bracket which the clustered transducer is installed on the mounting bracket along the skirt of the river.

The inside diameter, $D_A$, of the transducer ($1_A$) case is little bit larger than that of the transducer ($1_C$) case, $D_C$.

The wavelength of the ultrasonic pulse in water is just about 3–7 mm since ultrasonic pulses of 200–500 kHz are used when the width of river is about several tenth or hundredth meters. Therefore, obstacles sized 3–7 mm should not be placed in front of the transducer, ($1_A$). However, as shown in FIG. 5, if transducers, ($1_A$) and ($1_C$), are clustered with two ultrasonic transducers, there is no problem to transmit and receive ultrasonic pulses by transducers, ($1_A$) and ($1_C$).

The distance between transducers, ($1_A$) and ($1_C$), $\lambda$, is established from the allowable error of the time interval measurement apparatus tolerable in the ultrasonic flow meter. The flow velocity measurement error is dependent on the allowable error of L measurement. The relationship of $\lambda$ is given as follows:

$$l \geq \frac{2\tau \cdot C_{max}}{\delta_L} \quad (12)$$

where $\tau$ is the absolute error of time interval measurement, $C_{max}$ is the maximum ultrasonic velocity expected in the river water, and $\delta_L$ is the allowable relative error of L measurement.

For example, if $\tau = 10^{-7}$ s, $C_{max} = 1450$ m/s, $\delta_L = 0.001$ (0.1%);

$$l \geq \frac{2 \times 10^{-7} \cdot 1450}{10^{-3}} = 0.29$$

Figure 6:
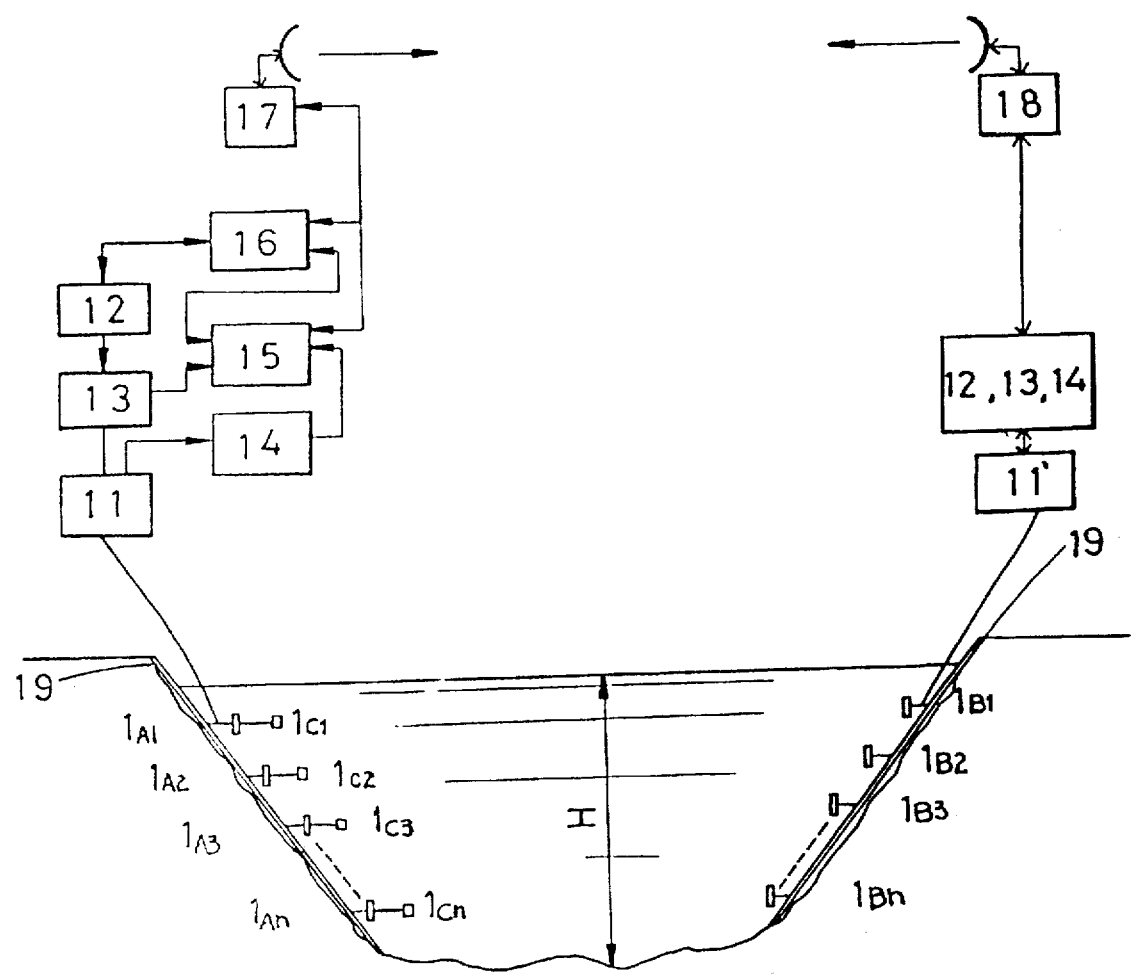
FIG. 6 is a view showing an actual example of flowrate measurement apparatus according to this invention.

FIG. 6 shows the schematic diagram of structure of the ultrasonic multichannel flowrate measurement apparatus. The calculation and control apparatus, (16), is equipped with the synchronized signal generator, (12), which generates clock pulses and the remote transmitter and receiver, (17), and calculates the flow velocity and flowrate of river as described later in detail.

The ultrasonic pulse signal is generated and input to the switch commutator, (11), by the ultrasonic pulse generator, (13). The ultrasonic pulse signal is input to the several clustered transducers installed along the skirt of the river by the switch commutator, (11).

The received signal from a switch commutator is reformed into the square pulse by the wave forming apparatus, (14), as described later.

The time interval between signals from the ultrasonic pulse generator, (13), and the wave forming apparatus, (14), that is, measured propagation time of ultrasonic wave is input to the calculation and control apparatus, (16), by the time interval measurement apparatus, (15).

Same as above, the transducers $(1_{B1}), (1_{B2}), \ldots, (1_{Bn})$ are installed along the skirt of other side of the river, and the switch commutator, (11'), the synchronized signal generator, (12), the ultrasonic pulse generator, (13), the wave forming apparatus, (14), and the remote transmitter and receiver, (18), are installed.

Therefore, the ultrasonic pulses are input to the transducers, $(1_{A1}, 1_{C1}), (1_{A2}, 1_{C2}), \ldots, (1_{An}, 1_{Cn})$, by the switch commutator, (11), according to the program, and received signals by transducers are input to the time interval measurement apparatus, (15), after reforming to the square pulses by the wave forming apparatus, (14). The coded signals of $t_{AB1}, t_{BA1}, t_{CB1}$, and $t_{BC1}$ corresponding to the transducers, $(1_{A1}), (1_{B1})$ and $(1_{C1})$, are generated and input to the calculation and control apparatus, (16), by the time interval measurement apparatus.

The flow velocities, $V_1, V_2, V_3, \ldots, V_n$, are measured by the above mentioned procedures repeated in the case of the second channel, third channel, ..., nth channel, (19), is a mounting bracket for the installation of the transducers.

The flowrate, Q, can be calculated using eq. (3) previously used, however, there is a more accurate method given as below. The total average velocity, $V_S$, is found using the equation given below by an integration after the horizontal flow velocity profile is made using measured data $V_1, V_2, V_3, \ldots, V_n$, and the flowrate, Q, is found by multiplying the cross sectional area S by $V_S$ which was previously found using the relationship S(H) between the cross sectional area and the water depth, H. That is, $$V_s = \frac{1}{S} \int_S \overline{V}(h) dS \quad (13)$$

$$Q = \overline{V_s} \cdot S \quad (14)$$

A water level meter to measure the water depth, H, is not shown in FIG. 6.

As comprising the flowrate measurement apparatus for a river or, open channel shown above, when it is not reasonable to connect the transducers installed on the both sides of the river to the secondary measurement apparatus, (11–16), using high frequency cable, it is better to use remote transmitters and receivers, (17) and (18). It is very effective that the transducers need not be installed on the both sides of the river, but transducers, $(1_{A1}), (1_{C1}), (1_{A2}), (1_{C2}), \ldots, (1_{An}), (1_{Cn})$, and $(1_{B1}), (1_{B2}), \ldots, (1_{Bn})$, are installed on one side of the river, and a reflecting apparatus is installed on the opposite side of the river.

There is no problem in failing to measure the distance, $L_i$, each time to measure the flowrate, but to measure $L_i$ periodically and to input to the calculating and control apparatus, (16).

Also the distance between transducers, $L_i$, may be measured, input and stored to the calculating and control apparatus, (16), while a clustered transducer is initially moved to the location at which the transducers, $(1_{A1})$, are installed, instead of installation of several clustered transducers, and general transducers, $(1_A)$, may be installed instead of clustered transducers.

The measurement errors of flow velocity and flowrate are decreased by providing the methods to calibrate and test the time interval measurement apparatus and flowrate calculating and control apparatus and the distance between transducers consisting clustered transducer according to this invention.

As seen in eq. (9) and (10), the measurement error of L is increased if the distance between two transducers consisting a clustered transducer, $\lambda$, is roughly measured, even though the time interval is measured very precisely. Therefore, the calibration and testing method to precisely measure $\lambda$ and to check the measurement error of time interval is required. There is an accurate length measurement apparatus whose accuracy is about $\pm 10^{-6}$ m, however, it is very difficult to precisely measure the distance, $\lambda$, substituted into eq. (9). The reasons are as follows that the delay time is included by various reasons even though the transmitting and receiving circuit of ultrasonic pulses and measurement circuit of time interval are precisely designed, and it is difficult to precisely measure the distance between transducers, $(1_{A1})$ and $(1_{C1})$, even though the delay time is short enough to be negligible.

Considering the above mentioned statements, the calibration method of $\lambda$ measurement is given as follows according to this invention.

Figure 7:
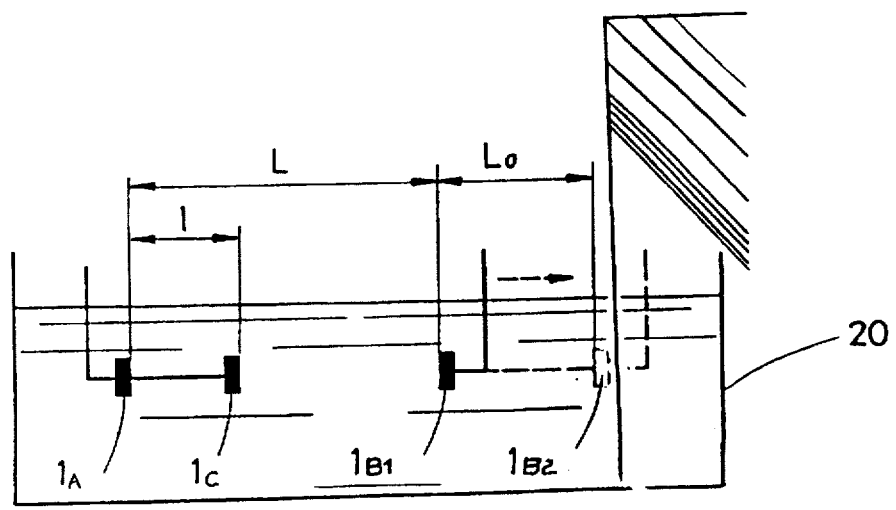
FIG. 7 is a view explaining the calibration and testing method according to this invention.

As shown in FIG. 7, the water tank, (20), is installed indoor so that the ambient temperature does not vary too much, and filled with water. Then the clustered transducers, $(1_A)$ and $(1_C)$, are installed in the water, and another transducer is installed at a distance of $L_1$ from the transducer, $(1_A)$. One does not need to precisely measure the distance, $L_1$, at this time.

The distance, $\lambda'$, is previously measured and input to the flow meter.

The reference time interval measurement apparatus of a higher accuracy is connected in parallel in order to get accurate $\lambda$ and to test the measurement accuracy of the time interval measurement apparatus.

The distance, $L'_1$, found from the flow meter is stored (recorded) by repeating the measurements of propagation time of the ultrasonic pulses, $t_{AB1}$, $t_{CB1}$, in the water tank using the equation given below;

$$L'_1 = \frac{t_{AB1}}{t_{AB1} - t_{CB1}} \cdot l' \quad (15)$$

where since $\lambda'$ is different from the virtual distance, $\lambda$, $L'_1$ calculated using eq. (15) is different from the virtual distance, $L_1$.

The transducer, ($1_B$), is moved by precisely measured distance, $L_0$. It is not that difficult to precisely measure $L_0$. Then the distances between transducers, ($1_A$) and ($1_B$), and ($1_C$) and ($1_B$), are $L_1+L_0$ and $L_1+L_0-\lambda$, respectively.

$L'_1+L'_0$ given below is found by the measurements of the propagation times of ultrasonic wave, $t_{AB2}$ and $t_{CB2}$, after the changing the location of the transducer, ($1_B$);

$$L'_1 + L'_0 = \frac{t_{AB2}}{t_{AB2} - t_{CB2}} \cdot l' \quad (16)$$

The following equation is found by subtracted eq. (15) from eq. (16);

$$L'_0 = \left( \frac{t_{AB2}}{t_{AB2} - t_{CB2}} - \frac{t_{AB1}}{t_{AB1} - t_{CB1}} \right) \cdot l' \quad (17)$$

The virtual distance, $L_0$ is given as follows if the measurement error of time interval is very small to be negligible (when the reference time interval measurement apparatus);

$$L_0 = \left( \frac{t_{AB2}}{t_{AB2} - t_{CB2}} - \frac{t_{AB1}}{t_{AB1} - t_{CB1}} \right) \cdot l \quad (18)$$

where $\lambda$ is a virtual distance to be found.

$$\frac{L_0}{L'_0} \text{ is } \frac{l}{l'}$$

and therefore;

$$l = \frac{L_0}{L'_0} \cdot l' \quad (19)$$

The more accurate distance, $\lambda$, can be found using eq. (19) as shown above. $L_0$ is measured repeatedly using eq. (18) by substituting the value of $\lambda$ into the calculating and control apparatus instead of $\lambda'$. If the measurement results are analyzed, it is easily known that the difference between the measured distances by the flow meter and the precise length measurement apparatus is a random error or a systematic error. If the systematic error is included, the above measurements are repeated by input of the more accurate value of $\lambda$ by eq. (19) to the flow meter.

The final value of $\lambda$ is input to the calculating and control apparatus of the flow meter until the systematic error disappears. The advantage of the $\lambda$ measurement method is that the value of $\lambda$ to compensate the delay time generated from the flow meter and transducers can be found.

The measurement error of propagation distance of ultrasonic pulse is tested by comparing with the distance measured by the flow meter and the precise length measurement apparatus while inputting the value of $\lambda$ found by the above mentioned method and changing the location of the transducer, ($1_B$). At the same time, the measurement error of time interval of the flow meter is tested by comparing with the reference time interval measurement apparatus. The error of input $\lambda$ and the measurement error of time interval are tested at the above mentioned water tank, and the error of flow velocity, $\delta_{\overline{v_1}}$ measured by eq. (5) and based on the measurement errors of L, $t_{AB}$, $t_{CB}$, $t_{BA}$, and $t_{BC}$, is evaluated. The value of $\lambda$ of another clustered transducer is measured by the above mentioned method and input to the calculating and control apparatus.

When evaluating the error of flow velocity, the followings are noted.

The absolute measurement error of $L_0$ is the sum of the measurement error of the precise length measurement apparatus, $(\Delta_L)_1$, and the absolute measurement error of the flow meter, $(\Delta L)_2$. Therefore, it is noted that the relative error of measured L at the open channel becomes $\Sigma\Delta L/L$ not $\Sigma\Delta L/L_0$.

The relative measurement error of propagation time of ultrasonic wave can be found dividing the absolute measurement error of propagation time tested in the water tank by measured time. The relative errors of time interval measurement $t_{AB}$, $t_{BA}$ and the L measurement results are substituted into the equation for the measurement error of the flow velocity.

The error test of the calculating and control apparatus performing the calculation of flowrate by eqs. (13) and (14) is easily done as follows. The total average flow velocity is calculated precisely by eq. (13) by preparing the velocity profiles of the horizontal average flow velocity, $\overline{V}_i$. Then the measurement error of $\overline{V'}_S$ is tested by comparing the $\overline{V'}_S$ calculated using the calculating and control apparatus of the flow meter through input of the corresponding flow velocity and distances with the exactly calculated $\overline{V}_S$.

The maximum relative measurement error of flowrate for the flow meter is given as follows;

$$\delta_Q = \delta\overline{v}_i + \delta\overline{v}_s + \delta_S \quad (20)$$

and it can be evaluated as follows $\delta_{\overline{VT}}$, and $\delta_{\overline{S}}$ are mainly composed of systematic error;

$$\delta_Q = (\delta^2\overline{v}_i + \delta^2\overline{v}_s + \delta^2 s)^{1/2} \quad (21)$$

where $\delta_S$ is the measurement error of the cross sectional area.

The flowrate measurement error of the multichannel ultrasonic flow meter for a large open channel is indirectly calibrated and tested with a high reliability under the condition that the flowrate, is measured using the method of this invention.

The industrial flow meters are directly calibrated and tested using a reference flow measurement apparatus, however, since flow meters of a large flowrate for the open channel is calibrated and tested using an indirect method, the reliability of the indirect calibration and testing can be enhanced using the precise ultrasonic flow velocity measurement method.

What is claimed is:

1. The method of measuring ultrasonic flow velocity and flowrate for open water channels comprising the steps:

establishing a plurality of channels to measure the horizontal average flow velocity with ultrasonic waves by installing a clustered set of spaced ultrasonic transducers having aligned primary and secondary ultrasonic transducers, ($1_{A1}$) and ($1_{C1}$), positioned along the banks on one side of an open channel, and positioning a third ultrasonic transducer, ($1_{B1}$), at a receptive position aligned with the aligned clustered transducers said aligned transducers defining a constant transmitting angle, $\phi$, with respect to the flow direction along a bank on an opposite side of the open channel;

adjusting the transmitting angle of the clustered transducers so that the amplitude of the signal received by the third transducer is maximum when ultrasonic waves are transmitted between the clustered transducers, $(1_{A1})$ and $(1_{C1})$, and the third transducer $(1_{B1})$;

measuring the distance, $L_i$, between the primary ultrasonic transducer, $(1_{A1})$ and the third transducer, $(1_{B1})$, by the measurements of the two propagation times of ultrasonic waves, $t_{AiBi}$ and $t_{CiBi}$, transmitted respectively from the primary and the secondary ultrasonic transducers, $(1_{A1})$ and $(1_{C1})$, and received by the third ultrasonic transducer, $(1_{B1})$; and measuring the horizontal average flow velocity, over the distance $L_i$ by the measurement of the propagation time of ultrasonic waves, $t_{BiAi}$, transmitted from the third ultrasonic transducer, $(1_{B1})$, and received by the primary ultrasonic transducer, $(1_{A1})$.

2. A measurement method as in claim 1, in which, when the water path of the river or open channel is not varying for a long time and the ultrasonic transducers are installed firmly so that the distance, $L_i$, between ultrasonic transducers, $(1_{A1})$ and $(1_{B1})$, is not varying, the measurement method for the flow velocity and the flowrate to install the ultrasonic transducers, $(1_{B1})$, $(1_{B2})$, $(1_{B3})$, . . . , $(1_{Bn})$, along the skirt of one side of the river or open channel; the distances, $L_1$, $L_2$, $L_3$, . . . , $L_n$, are measured and stored in the calculating and control apparatus of the flow meter while moving a clustered transducer along the skirt of opposite side of the river or open channel at which the ultrasonic transducers, $(1_{A1})$, $(1_{A2})$, $(1_{A3})$, . . . , $(1_{An})$ are supposed to be installed.

3. The method claim of claim 1, further comprising the steps of:

measurement of the flowrate by approximate integration of total average flow velocity after obtaining a profile of the horizontal average flow velocity as a function of water depth, and the distance, $L_i$, between ultrasonic transducers, $(1_{A1})$ and $(1_{B1})$, using the following equation when the flow velocity is small:

$$L_{T_i} = \frac{t_{AiBi}}{t_{AiBi} - t_{CiBi}} \cdot l = L_i. \tag{a}$$

4. The method of claim 3, for more accurately determining the distance $L_i$, further comprises the steps of:

calculating the distance, $L_i$, using the following equation (b) by substituting the measured $L_{T_i}$ using eq. (b) when the flow velocity is large $$L_i = L_{T_i}\left(1 + \frac{v'}{C}\right) \tag{b}$$

where C is that ultrasonic wave velocity calculated by said calculating and control apparatus using the following equation:

$$C = \frac{L_{T_i}}{(t_{AB} \cdot t_{BA})^{1/2}} \tag{c}$$

and v' is the velocity component on the line $L_i$ calculated using the following equation, and $$v'_i = \frac{(t_{BiAi} - t_{AiBi})L_{T_i}}{2t_{AiBi} \cdot t_{BiAi}} \tag{d}$$

the horizontal average flow velocity, $\overline{V}_i$, is measured using the following equation by substituting the more accurately measured $L_i$ into the flow velocity calculation equation;

$$\overline{V}_i = \frac{(t_{BiAi} - t_{AiBi})L_i}{2t_{AiBi} \cdot t_{BiAi} \cdot \cos\phi} = \frac{L_i^2}{2d_i} \cdot \frac{t_{BiAi} - t_{AiBi}}{t_{AiBi} \cdot t_{BiAi}} \tag{e}$$

5. A measurement method as in claim 4, in which the measurement method of flow velocity and flowrate is achieved by correcting and comparing with $L_i$ previously input and periodically measured $L_i$ through the measurements of the propagation times, $t_{AiBi}$ and $t_{BiAi}$, of ultrasonic pulses when measuring the flow rate so that the distance between ultrasonic transducers, $L_i$, is not measured whenever the flowrate is measured, but the distance is measured once and input for storage in the calculation and control apparatus contained in the flow meter itself.

6. The method of calibration and testing multichannel ultrasonic flowrate measurement apparatus having a time internal measurement apparatus of predetermined accuracy comprising the steps of:

employing calculating and control apparatus;

installing clustered transducer sets consisting of primary and secondary ultrasonic transducers, $(1_{A1})$ and $(1_{C1})$, at a constant distance, $L_A$ from a third ultrasonic transducer, $(1_{B1})$, a water tank filled with water, and inputting and storing the distance, $\lambda'$, between ultrasonic transducers, $(1_A)$ and $(1_C)$, measured by length measurement apparatus into the calculating and control apparatus;

coupling a high accuracy reference time interval measurement apparatus to a time interval measurement apparatus contained in the flowrate measurement apparatus in parallel;

measuring the propagation times, $t_{AB}$ and $t_{CA}$, of ultrasonic waves respectively from the primary transducer, $(1_A)$, and the secondary transducer, $(1_C)$, to the third transducer, $(1_B)$, and the distance $L_A$, through the measurements of the propagation times, $t_{BC}$ and $t_{BA}$, from transducers $(1_B)$ to $(1_A)$ and $(1_C)$, that is:

$$L'_{A1} = \frac{(t_{AB})_1}{(t_{AB} - t_{CB})_1} \cdot t'; \quad L'_{A2} = \frac{(t_{BA})_1}{(t_{BA} - t_{BC})_1} \cdot t' \tag{a}$$

$$L'_A = \frac{L'_{A1} + L'_{A2}}{2}$$

measuring $L'_A + L'_o$ through the measurements of above mentioned propagation times of ultrasonic wave after moving the ultrasonic transducer $(1_B)$, by a precisely measured distance, $L_o$, that is;

$$L'_A + L'_0 = \frac{t'}{2} \cdot \left[\frac{(t_{AB})_2}{(t_{AB} - t_{CB})_2} + \frac{(t_{BA})_2}{(t_{BA} - t_{BC})_2}\right] \tag{b}$$

calculating the precise distance $\lambda$ through getting $L'_o$ by substituting $L'_A$ from above measured $L'_A + L'_o$, that is;

$$L'_A + L'_0 - L'_A = L'_0 \tag{c}$$

$$l = \frac{L_0}{L'_0} \cdot t' \tag{d}$$

inputting the corrected $\lambda$ instead of an initially stored $\lambda'$; measuring $L'_A + L'_o$ using the above mentioned method, testing whether the value of $L'_o$ found using eq. (c) is equal to the precisely measured value, and if $(L'_o - L_o)/L_o$ exceeds the allowable error, calculating $\lambda$ more accurately by substituting $L'_o$ into eq. (d);

adjusting and locking the value of distance, λ, between the primary and the secondary transducers contained in the clustered transducer using above mentioned method;

calculating the measurement error of propagation time through consideration of L of open channel and comparison of measured time intervals, $t_{AB}$, $t_{CB}$, $t_{BA}$, $t_{BC}$, by the time interval measurement apparatus included in the flow meter itself and the reference time interval measurement apparatus, and evaluating the measurement error of flow velocity using the measurement error of L and time interval; at each channel obtained from the above velocity profile function; and calibrating and testing the multichannel ultrasonic flow meter for open water channels by adding the measurement errors of the flow velocity, the flowrate calculating error and cross sectional area tested using above mentioned steps.

7. A multichannel ultrasonic flowrate measurement apparatus, comprising in combination, a plurality of paired ultrasonic transducers mounted at a predetermined water depth along the banks of at least one side of an open water channel, said paired transducers being spaced a constant distance from each other, an ultrasonic pulse generator to vibrate said paired transducers, a remote transmitter and receiver, an ultrasonic propagating time measurement apparatus to measure the propagation time between the transducers, a switch commutator with a switching function to give outputs in turn to the transducers and receive corresponding ultrasonic pulses and a calculation and control apparatus to measure the flowrate of water in the channel in response to the measured propagation time, wherein the paired transducers mounted on the bank of one side of the open channel comprises two transducers $1_A$ and $1_C$ which are mounted in an array in which a first transducer $1_A$ is of an annular ring type having a hole at the center, said paired transducers having the annular ring transducer mounted in a first position and a second cylindrical transducer $1_C$ mounted in a second position positioned at a distance 1 from the first transducer $1_A$, and mounted within a pipe having one end located inside the annular ring of transducer $1_A$, and other end terminating near the transducer $1_C$ cylinder; the distance 1 between the first and second transducer being:

$$l \geq \frac{2\tau \cdot C_{max}}{\delta_L}$$

wherein, $\tau$ is the absolute error of said time measurement apparatus, $\delta_L$ is an allowable relative error of the distance 1 and $C_{max}$ is a maximum ultrasonic propagating velocity expected in open water channels.

* * * * *